United States Patent
Chen et al.

(10) Patent No.: US 7,783,131 B2
(45) Date of Patent: Aug. 24, 2010

(54) METHOD OF GENERATING POSITIONING COEFFICIENTS FOR STRIP-BASED SATELLITE IMAGE

(75) Inventors: Liang-Chien Chen, Pingjhen (TW); Tee-Ann Teo, Johor (MY); Chien-Liang Liu, Taoyuan (TW); Jer-Jiunn Chen, Jhongli (TW)

(73) Assignee: National Central University, Taoyuan County (TW)

( * ) Notice: Subject to any disclaimer, the term of this patent is extended or adjusted under 35 U.S.C. 154(b) by 920 days.

(21) Appl. No.: 11/442,633

(22) Filed: May 30, 2006

(65) Prior Publication Data

US 2007/0189598 A1    Aug. 16, 2007

(30) Foreign Application Priority Data

Feb. 16, 2006 (TW) ................................. 095105286

(51) Int. Cl.
*G06K 9/32* (2006.01)

(52) U.S. Cl. ...................................................... 382/293
(58) Field of Classification Search ................... 382/293
See application file for complete search history.

(56) References Cited

U.S. PATENT DOCUMENTS

| 6,084,989 | A * | 7/2000 | Eppler ......................... 382/293 |
| 6,735,348 | B2 * | 5/2004 | Dial et al. .................... 382/293 |
| 6,810,153 | B2 * | 10/2004 | Komura et al. ............... 382/295 |
| 7,310,440 | B1 * | 12/2007 | Dolloff ........................ 382/154 |
| 2005/0147324 | A1 * | 7/2005 | Kwoh et al. ................. 382/293 |

\* cited by examiner

*Primary Examiner*—Bhavesh M Mehta
*Assistant Examiner*—Hadi Akhavannik
(74) *Attorney, Agent, or Firm*—Jackson IPG PLLC; Demian K. Jackson

(57) ABSTRACT

The present invention provides coefficient for a strip-based image taken by a satellite. By using the coefficient, the absolute error of the image can be made smaller than two pixels. Therefore, the accuracy of the image is high. The present invention can be applied to any pushbroom scanning satellite.

3 Claims, 13 Drawing Sheets

| Satellite position X (meter) | Satellite position Y (meter) | Satellite position Z (meter) | Satellite velocity $V_X$ (m/sec) | Satellite velocity $V_Y$ (m/sec) | Satellite velocity $V_Z$ (m/sec) | Corresponding time of scanning line (y-m-dTh:m:s) |
|---|---|---|---|---|---|---|
| -3493942.8126 | 4810700.0747 | 4061125.1002 | -978.3769193 | 4399.9129760 | -6036.291288 | 2005-09-20 T 02:27:28.000000 |
| -3521334.8540 | 4940439.4926 | 3878110.5414 | -847.7222674 | 4248.5966700 | -6163.701537 | 2005-09-20 T 02:27:58.000000 |
| -3544804.7373 | 5065569.4572 | 3691362.2852 | -716.9239841 | 4092.6405390 | -6285.184257 | 2005-09-20 T 02:28:28.000000 |
| -3564350.3378 | 5185953.0002 | 3501059.9457 | -586.1276102 | 3932.1938800 | -6400.621200 | 2005-09-20 T 02:28:58.000000 |
| -3579973.8888 | 5301457.7089 | 3307386.5968 | -455.4781002 | 3767.4110710 | -6509.899983 | 2005-09-20 T 02:29:28.000000 |
| -3591681.9614 | 5411955.8764 | 3110528.5942 | -325.1196556 | 3598.4514150 | -6612.914229 | 2005-09-20 T 02:29:58.000000 |
| -3599485.4391 | 5517324.6463 | 2910675.3931 | -195.1955549 | 3425.4789720 | -6709.563680 | 2005-09-20 T 02:30:28.000000 |
| -3603399.4881 | 5617446.1537 | 2708019.3638 | -65.8479849 | 3248.6623870 | -6799.754304 | 2005-09-20 T 02:30:58.000000 |
| -3603443.5215 | 5712207.6591 | 2502755.6025 | 62.7821240 | 3068.1747110 | -6883.398384 | 2005-09-20 T 02:31:28.000000 |
| -3599641.1596 | 5801501.6789 | 2295081.7416 | 190.5552544 | 2884.1932400 | -6960.414598 | 2005-09-20 T 02:31:58.000000 |
| -3592020.1852 | 5885226.1099 | 2085197.7560 | 317.3334530 | 2696.8993460 | -7030.728099 | 2005-09-20 T 02:32:28.000000 |
| -3580612.4943 | 5963284.3489 | 1873305.7677 | 442.9804798 | 2506.4783060 | -7094.270612 | 2005-09-20 T 02:32:58.000000 |
| -3565454.0425 | 6035585.4076 | 1659609.8476 | 567.3619628 | 2313.1191210 | -7150.980518 | 2005-09-20 T 02:33:28.000000 |

FIG.4A

| Satellite Rotation angle on X-axis (rad) | Satellite Rotation angle on Y-axis (rad) | Satellite Rotation angle on Z-axis (rad) | Corresponding time of scanning line (y-m-dT h:m: s) |
|---|---|---|---|
| 1.2386209065E-■ | -4.2883389090E-04 | -1.1657936647E-■ | ■-09-20T02:30:02.314031 |
| 1.2386273142E-■ | -4.2889840846E-■ | -1.1628907022E-■ | ■-20T02:30:02.439031 |
| 1.2384548344E-■ | -4.2906929892E-■ | -1.1635644267E-■ | ■-20T02:30:02.564031 |
| 1.2384544228E-■ | -4.2910416528E-■ | -1.1647246293E-■ | ■-20T02:30:02.689030 |
| ... | ... | ... | ... |
| 1.2482158903E-■ | -4.2854479019E-■ | -9.7185324250E-05 | ■-20T02:31:13.938861 |
| 1.2483081189E-■ | -4.2850919679E-■ | -9.7188222221E-■ | ■-20T02:31:14.063861 |
| 1.2483992611E-■ | -4.2847250603E-■ | -9.7192659347E-■ | ■-20T02:31:14.188860 |
| 1.2484388895E-■ | -4.2866930412E-■ | -9.7188584520E-■ | ■-20T02:31:14.313860 |
| 1.2484752945E-■ | -4.2880502610E-■ | -9.6963159511E-■ | ■-20T02:31:14.438860 |

FIG.4B

| Point number | TYPE | S (53) | L (54) | E (55) | N (56) | H (57) |
|---|---|---|---|---|---|---|
| 1 | GCP | 14532.67 | 94295.95 | 266099.69 | 2622887.37 | 1139.02 |
| 2 | ICP | 16578.01 | 150107.35 | 241262.38 | 2485341.16 | 96.39 |
| 3 | ICP | 19319.24 | 175036.58 | 234867.13 | 2422870.34 | 60.39 |
| 4 | ICP | 14118.14 | 171162.12 | 223574.88 | 2435238.61 | 40.11 |
| 5 | ICP | 16857.54 | 168707.78 | 231975.25 | 2439713.23 | 91.36 |
| 6 | ICP | 11316.52 | 166022.11 | 219094.52 | 2449384.07 | 40.00 |
| 7 | ICP | 17736.85 | 162370.15 | 237632.35 | 2454714.77 | 34.42 |
| 8 | ICP | 8693.71 | 161685.06 | 214603.86 | 2461456.19 | 23.86 |
| 9 | ICP | 14422.57 | 160973.31 | 229918.37 | 2459968.12 | 292.30 |
| 10 | ICP | 11514.74 | 158157.53 | 223901.25 | 2468480.08 | 257.12 |
| 11 | ICP | 2223.29 | 155104.39 | 201179.78 | 2481207.79 | 25.47 |
| 12 | ICP | 17201.31 | 153783.76 | 240876.24 | 2476007.41 | 44.39 |
| 13 | ICP | 8322.92 | 152753.52 | 218487.32 | 2483488.67 | 204.98 |
| 14 | ICP | 2113.60 | 149149.29 | 204079.38 | 2495824.72 | 33.56 |
| 15 | ICP | 13951.00 | 148932.02 | 235159.99 | 2489661.79 | 247.40 |
| 16 | ICP | 7110.37 | 146581.06 | 218699.89 | 2499245.68 | 412.98 |
| 17 | ICP | 18424.72 | 143872.24 | 249340.79 | 2499563.26 | 39.35 |
| 18 | ICP | 12493.85 | 142087.04 | 235227.67 | 2507180.99 | 864.40 |
| 19 | ICP | 1477.77 | 140178.74 | 207227.41 | 2518105.18 | 83.64 |
| 20 | ICP | 19943.29 | 138511.13 | 256100.34 | 2511825.85 | 38.30 |
| 21 | ICP | 10171.80 | 136135.85 | 232438.51 | 2523021.76 | 1007.37 |
| 22 | ICP | 2657.74 | 134699.67 | 213298.87 | 2530816.75 | 158.82 |
| 23 | ICP | 22296.78 | 134154.41 | 264445.29 | 2521189.96 | 55.05 |
| 24 | ICP | 13536.63 | 133421.63 | 242520.97 | 2527792.50 | 714.39 |
| 25 | ICP | 3194.45 | 128688.36 | 218036.57 | 2545189.06 | 500.96 |
| 26 | ICP | 20006.91 | 126897.72 | 262543.63 | 2540185.68 | 273.11 |
| 27 | ICP | 7729.30 | 126431.16 | 231289.99 | 2548109.14 | 1059.34 |
| 28 | ICP | 21842.07 | 125445.41 | 267983.23 | 2542732.41 | 197.98 |
| 29 | ICP | 12843.67 | 122285.00 | 246858.88 | 2555382.59 | 1345.35 |
| 30 | ICP | 5509.44 | 119253.24 | 229198.86 | 2566921.23 | 647.27 |

FIG.5B

| Point number | TYPE | S 53 | L 54 | E 55 | N 56 | H 57 |
|---|---|---|---|---|---|---|
| 31 | ICP | 22731.55 | 117002.23 | 274775.01 | 2562886.63 | 246.81 |
| 32 | ICP | 162.19 | 116602.59 | 216446.26 | 2576448.64 | 373.91 |
| 33 | ICP | 13885.36 | 114639.39 | 253905.49 | 2573444.53 | 2414.30 |
| 34 | ICP | 8566.48 | 111607.00 | 241524.00 | 2583847.05 | 1557.39 |
| 35 | ICP | 20801.69 | 109982.93 | 273621.28 | 2581112.54 | 287.85 |
| 36 | ICP | 14354.12 | 106248.68 | 259435.11 | 2593727.46 | 1799.19 |
| 37 | ICP | 7215.16 | 103141.25 | 242363.31 | 2605338.10 | 1014.39 |
| 38 | ICP | 12433.86 | 101288.48 | 257112.19 | 2606919.48 | 1717.26 |
| 39 | ICP | 22453.89 | 100530.66 | 282915.01 | 2603316.95 | 505.55 |
| 40 | ICP | 879.82 | 96193.99 | 229274.59 | 2625913.89 | 519.27 |
| 41 | ICP | 9336.54 | 95680.28 | 251811.57 | 2622397.20 | 824.33 |
| 42 | ICP | 21893.00 | 93997.02 | 284963.97 | 2619593.67 | 473.49 |
| 43 | ICP | 16804.84 | 90829.34 | 274024.58 | 2630066.07 | 2096.84 |
| 44 | ICP | 20836.22 | 89963.32 | 284405.37 | 2630038.25 | 428.51 |
| 45 | ICP | 4511.15 | 88161.14 | 243160.12 | 2643492.93 | 677.39 |
| 46 | ICP | 10367.56 | 87383.01 | 258927.75 | 2642097.88 | 896.21 |
| 47 | ICP | 4324.46 | 82958.77 | 245371.18 | 2656322.11 | 466.37 |
| 48 | ICP | 9768.39 | 81687.90 | 260361.98 | 2656372.38 | 771.17 |
| 49 | ICP | 17917.19 | 80359.97 | 282281.83 | 2655085.28 | 1428.58 |
| 50 | ICP | 21872.27 | 78627.70 | 293135.50 | 2657207.26 | 684.04 |
| 51 | ICP | 11272.05 | 75358.07 | 267704.58 | 2671006.29 | 1033.99 |
| 52 | ICP | 4800.85 | 73812.75 | 251560.97 | 2678394.19 | 769.33 |
| 53 | ICP | 16475.24 | 73424.37 | 282404.54 | 2672819.67 | 2016.57 |
| 54 | ICP | 22830.83 | 70606.63 | 299794.40 | 2676313.47 | 504.74 |
| 55 | ICP | 9080.80 | 68437.29 | 265899.57 | 2689094.95 | 1844.02 |
| 56 | ICP | 14391.03 | 65293.87 | 281288.85 | 2693859.68 | 1733.62 |
| 57 | ICP | 20753.60 | 64781.83 | 297974.90 | 2691616.34 | 2203.79 |
| 58 | ICP | 4780.94 | 64482.39 | 256507.65 | 2701205.14 | 965.27 |
| 59 | ICP | 15009.40 | 61204.32 | 285116.53 | 2703503.92 | 2013.48 |
| 60 | ICP | 10026.87 | 57692.48 | 273936.30 | 2714872.11 | 1436.84 |

FIG.5C

| Point number | TYPE | S (53) | L (54) | E (55) | N (56) | H (57) |
|---|---|---|---|---|---|---|
| 61 | ICP | 4817.32 | 55878.98 | 261001.20 | 2722256.33 | 401.16 |
| 62 | ICP | 19356.85 | 53908.33 | 299735.33 | 2719052.62 | 402.74 |
| 63 | ICP | 11273.93 | 53755.65 | 279097.70 | 2723838.29 | 843.69 |
| 64 | ICP | 3121.16 | 49846.70 | 259638.35 | 2737967.02 | 134.19 |
| 65 | ICP | 12872.90 | 48977.16 | 285660.88 | 2734666.32 | 414.46 |
| 66 | ICP | 18069.78 | 45192.06 | 301044.30 | 2741081.30 | 382.71 |
| 67 | ICP | 10404.18 | 43845.30 | 281958.48 | 2748573.13 | 415.59 |
| 68 | ICP | 5785.35 | 43293.51 | 270133.04 | 2752496.57 | 245.92 |
| 69 | ICP | 860.45 | 42026.04 | 257793.19 | 2758360.11 | 129.24 |
| 70 | ICP | 19031.64 | 40955.50 | 305689.99 | 2750930.90 | 126.69 |
| 71 | ICP | 9626.10 | 39298.51 | 282252.33 | 2760142.18 | 138.58 |
| 72 | ICP | 13515.66 | 39273.77 | 292347.44 | 2758060.58 | 65.08 |
| 73 | ICP | 2460.97 | 36318.02 | 265016.15 | 2771420.54 | 65.04 |
| 74 | ICP | 19596.57 | 35025.91 | 310256.67 | 2765132.90 | 87.87 |
| 75 | ICP | 16329.14 | 34464.29 | 302135.96 | 2768281.90 | 24.67 |
| 76 | ICP | 10401.98 | 33841.07 | 287186.83 | 2773054.45 | 268.38 |
| 77 | ICP | 5509.29 | 33105.28 | 274723.66 | 2777581.44 | 27.82 |
| 78 | ICP | 14288.38 | 30390.77 | 299018.36 | 2779375.55 | 23.76 |
| 79 | ICP | 22146.88 | 30200.79 | 319306.52 | 2775563.75 | 42.77 |
| 80 | ICP | 11178.20 | 28211.17 | 292105.04 | 2786410.92 | 23.09 |
| 81 | ICP | 13608.95 | 25499.34 | 299875.64 | 2791703.38 | 170.74 |
| 82 | ICP | 18750.54 | 24592.20 | 313560.88 | 2791124.75 | 21.15 |

| 61 | 62 |
|---|---|
| LINE_NUM_COEFF_1:-8.450028006544052E-04<br>LINE_NUM_COEFF_2:-7.265911455850359E-02<br>LINE_NUM_COEFF_3:-9.773116289378024E-01<br>LINE_NUM_COEFF_4:+6.751215719404829E-05<br>LINE_NUM_COEFF_5:-1.607049249816917E-04<br>LINE_NUM_COEFF_6:-9.216702702707370E-06<br>LINE_NUM_COEFF_7:-1.267843651322521E-04<br>LINE_NUM_COEFF_8:-1.016544725381573E-03<br>LINE_NUM_COEFF_9:-1.879273546959455E-03<br>LINE_NUM_COEFF_10:+2.085785403207888E-06<br>LINE_NUM_COEFF_11:+6.813577738356765E-06<br>LINE_NUM_COEFF_12:+1.266984048754331E-04<br>LINE_NUM_COEFF_13:+2.263180227379614E-03<br>LINE_NUM_COEFF_14:+1.703951793770308E-04<br>LINE_NUM_COEFF_15:+1.844527053304692E-03<br>LINE_NUM_COEFF_16:+3.586438626541359E-03<br>LINE_NUM_COEFF_17:+2.292556807346635E-03<br>LINE_NUM_COEFF_18:+2.066464764100473E-07<br>LINE_NUM_COEFF_19:+1.022337784618350E-05<br>LINE_NUM_COEFF_20:-1.586831910023543E-07<br>LINE_DEN_COEFF_1:+1.000000000000000E+00<br>LINE_DEN_COEFF_2:+2.238930915573182E-03<br>LINE_DEN_COEFF_3:+1.031487538870646E-03<br>LINE_DEN_COEFF_4:+1.284944917780556E-04<br>LINE_DEN_COEFF_5:-1.938523385169428E-03<br>LINE_DEN_COEFF_6:-6.031334271853345E-06<br>LINE_DEN_COEFF_7:-1.078140005621696E-05<br>LINE_DEN_COEFF_8:-1.794284408615395E-03<br>LINE_DEN_COEFF_9:-3.707236457221739E-03<br>LINE_DEN_COEFF_10:-2.345717954959525E-03<br>LINE_DEN_COEFF_11:+6.472492527836645E-10<br>LINE_DEN_COEFF_12:+1.740303147816061E-06<br>LINE_DEN_COEFF_13:-7.111874346726714E-06<br>LINE_DEN_COEFF_14:-2.321257621234031E-06<br>LINE_DEN_COEFF_15:-6.191962849819090E-07<br>LINE_DEN_COEFF_16:+5.483525593371893E-06<br>LINE_DEN_COEFF_17:+1.212568646926965E-06<br>LINE_DEN_COEFF_18:-1.086183665645161E-08<br>LINE_DEN_COEFF_19:-8.748764816985180E-10<br>LINE_DEN_COEFF_20:+1.025281186339821E-09 | SAMP_NUM_COEFF_1:+1.597932130371254E-02<br>SAMP_NUM_COEFF_2:+2.465948472538817E+00<br>SAMP_NUM_COEFF_3:-1.556117739014852E+00<br>SAMP_NUM_COEFF_4:-1.662778669698084E-02<br>SAMP_NUM_COEFF_5:+3.009827242921807E-02<br>SAMP_NUM_COEFF_6:+1.738033761540664E-03<br>SAMP_NUM_COEFF_7:-2.052457031235286E-03<br>SAMP_NUM_COEFF_8:+5.708503336540556E-02<br>SAMP_NUM_COEFF_9:-5.511695067718857E-02<br>SAMP_NUM_COEFF_10:-1.032604922910491E-05<br>SAMP_NUM_COEFF_11:-5.480900483361140E-04<br>SAMP_NUM_COEFF_12:-1.145444144077318E-02<br>SAMP_NUM_COEFF_13:+2.519751548663126E-03<br>SAMP_NUM_COEFF_14:-2.507877137167824E-04<br>SAMP_NUM_COEFF_15:+9.447268283355071E-03<br>SAMP_NUM_COEFF_16:-3.769618050966845E-03<br>SAMP_NUM_COEFF_17:+1.598697950657701E-04<br>SAMP_NUM_COEFF_18:+3.249052026790267E-04<br>SAMP_NUM_COEFF_19:+1.719087236971006E-04<br>SAMP_NUM_COEFF_20:+1.705274947572804E-06<br>SAMP_DEN_COEFF_1:+1.000000000000000E+00<br>SAMP_DEN_COEFF_2:-1.326337554367162E-03<br>SAMP_DEN_COEFF_3:+5.827218676658689E-02<br>SAMP_DEN_COEFF_4:-1.636098245959929E-03<br>SAMP_DEN_COEFF_5:+5.125942266554703E-04<br>SAMP_DEN_COEFF_6:+2.426993874360406E-05<br>SAMP_DEN_COEFF_7:-2.310530755557094E-04<br>SAMP_DEN_COEFF_8:-4.809964256221466E-03<br>SAMP_DEN_COEFF_9:+3.750380475087471E-03<br>SAMP_DEN_COEFF_10:-1.028153439568413E-04<br>SAMP_DEN_COEFF_11:+1.846436620231428E-05<br>SAMP_DEN_COEFF_12:+3.344142947730925E-04<br>SAMP_DEN_COEFF_13:+2.347724353399840E-04<br>SAMP_DEN_COEFF_14:+2.653349850376130E-06<br>SAMP_DEN_COEFF_15:-5.739090887326623E-04<br>SAMP_DEN_COEFF_16:+4.916670729937739E-05<br>SAMP_DEN_COEFF_17:-2.991436683273674E-06<br>SAMP_DEN_COEFF_18:-2.938494009466220E-06<br>SAMP_DEN_COEFF_19:-1.552357790386358E-05<br>SAMP_DEN_COEFF_20:+4.272049220765961E-07 |

FIG.6

| Point number | TYPE | S 53 | L 54 | S' 71 | L' 72 | ΔS 73 | ΔL 74 |
|---|---|---|---|---|---|---|---|
| 31 | ICP | 22731.55 | 117002.23 | 22729.41 | 117004.03 | -2.14 | 1.80 |
| 32 | ICP | 162.19 | 116602.59 | 160.87 | 116604.53 | -1.32 | 1.94 |
| 33 | ICP | 13885.36 | 114639.39 | 13882.84 | 114639.31 | -2.52 | -0.08 |
| 34 | ICP | 8566.48 | 111607.00 | 8566.94 | 111608.37 | 0.46 | 1.37 |
| 35 | ICP | 20801.69 | 109982.93 | 20802.53 | 109982.62 | 0.84 | -0.31 |
| 36 | ICP | 14354.12 | 106248.68 | 14352.26 | 106249.25 | -1.86 | 0.57 |
| 37 | ICP | 7215.16 | 103141.25 | 7214.81 | 103140.94 | -0.35 | -0.31 |
| 38 | ICP | 12433.86 | 101288.48 | 12436.50 | 101289.29 | 2.64 | 0.81 |
| 39 | ICP | 22453.89 | 100530.66 | 22450.25 | 100531.27 | -3.64 | 0.61 |
| 40 | ICP | 879.82 | 96193.99 | 881.31 | 96193.67 | 1.49 | -0.32 |
| 41 | ICP | 9336.54 | 95680.28 | 9335.26 | 95682.26 | -1.28 | 1.98 |
| 42 | ICP | 21893.00 | 93997.02 | 21892.24 | 94001.05 | -0.76 | 4.03 |
| 43 | ICP | 16804.84 | 90829.34 | 16803.35 | 90831.01 | -1.49 | 1.67 |
| 44 | ICP | 20836.22 | 89963.32 | 20836.04 | 89967.43 | -0.18 | 4.11 |
| 45 | ICP | 4511.15 | 88161.14 | 4512.01 | 88160.36 | 0.86 | -0.78 |
| 46 | ICP | 10367.56 | 87383.01 | 10367.44 | 87386.94 | -0.12 | 3.93 |
| 47 | ICP | 4324.46 | 82958.77 | 4325.20 | 82960.02 | 0.74 | 1.25 |
| 48 | ICP | 9768.39 | 81687.90 | 9767.21 | 81689.15 | -1.18 | 1.25 |
| 49 | ICP | 17917.19 | 80359.97 | 17916.85 | 80363.77 | -0.34 | 3.80 |
| 50 | ICP | 21872.27 | 78627.70 | 21870.84 | 78626.32 | -1.43 | -1.38 |
| 51 | ICP | 11272.05 | 75358.07 | 11272.40 | 75357.43 | 0.35 | -0.64 |
| 52 | ICP | 4800.85 | 73812.75 | 4800.76 | 73815.41 | -0.09 | 2.66 |
| 53 | ICP | 16475.24 | 73424.37 | 16472.73 | 73425.40 | -2.51 | 1.03 |
| 54 | ICP | 22830.83 | 70606.63 | 22829.57 | 70605.47 | -1.26 | -1.16 |
| 55 | ICP | 9080.80 | 68437.29 | 9081.32 | 68439.91 | 0.52 | 2.62 |
| 56 | ICP | 14391.03 | 65293.87 | 14391.32 | 65295.05 | 0.29 | 1.18 |
| 57 | ICP | 20753.60 | 64781.83 | 20750.43 | 64783.62 | -3.17 | 1.79 |
| 58 | ICP | 4780.94 | 64482.39 | 4780.17 | 64485.53 | -0.77 | 3.14 |
| 59 | ICP | 15009.40 | 61204.32 | 15009.49 | 61208.02 | 0.09 | 3.70 |
| 60 | ICP | 10026.87 | 57692.48 | 10026.83 | 57692.83 | -0.04 | 0.35 |

FIG.7B

| Point number | TYPE | S | L | S' | L' | ΔS | ΔL |
|---|---|---|---|---|---|---|---|
| 61 | ICP | 4817.32 | 55878.98 | 4820.02 | 55878.56 | 2.70 | -0.42 |
| 62 | ICP | 19356.85 | 53908.33 | 19352.80 | 53910.12 | -4.05 | 1.79 |
| 63 | ICP | 11273.93 | 53755.65 | 11274.12 | 53756.62 | 0.19 | 0.97 |
| 64 | ICP | 3121.16 | 49846.70 | 3120.51 | 49847.28 | -0.65 | 0.58 |
| 65 | ICP | 12872.90 | 48977.16 | 12874.59 | 48976.62 | 1.69 | -0.54 |
| 66 | ICP | 18069.78 | 45192.06 | 18068.14 | 45191.05 | -1.64 | -1.01 |
| 67 | ICP | 10404.18 | 43845.30 | 10404.87 | 43846.64 | 0.69 | 1.34 |
| 68 | ICP | 5785.35 | 43293.51 | 5784.15 | 43293.50 | -1.20 | -0.01 |
| 69 | ICP | 860.45 | 42026.04 | 859.69 | 42024.18 | -0.76 | -1.86 |
| 70 | ICP | 19031.64 | 40955.50 | 19031.36 | 40955.21 | -0.28 | -0.29 |
| 71 | ICP | 9626.10 | 39298.51 | 9625.10 | 39298.25 | -1.00 | -0.26 |
| 72 | ICP | 13515.66 | 39273.77 | 13514.38 | 39274.66 | -1.28 | 0.89 |
| 73 | ICP | 2460.97 | 36318.02 | 2461.63 | 36316.71 | 0.66 | -1.31 |
| 74 | ICP | 19596.57 | 35025.91 | 19596.47 | 35025.63 | -0.10 | -0.28 |
| 75 | ICP | 16329.14 | 34464.29 | 16327.02 | 34467.35 | -2.12 | 3.06 |
| 76 | ICP | 10401.98 | 33841.07 | 10401.81 | 33840.88 | -0.17 | -0.19 |
| 77 | ICP | 5509.29 | 33105.28 | 5510.31 | 33102.45 | 1.02 | -2.83 |
| 78 | ICP | 14288.38 | 30390.77 | 14286.62 | 30388.78 | -1.76 | -1.99 |
| 79 | ICP | 22146.88 | 30200.79 | 22145.06 | 30199.19 | -1.82 | -1.60 |
| 80 | ICP | 11178.20 | 28211.17 | 11177.85 | 28210.29 | -0.35 | -0.88 |
| 81 | ICP | 13608.95 | 25499.34 | 13608.24 | 25498.21 | -0.71 | -1.13 |
| 82 | ICP | 18750.54 | 24592.20 | 18747.76 | 24591.97 | -2.78 | -0.23 |

METHOD OF GENERATING POSITIONING COEFFICIENTS FOR STRIP-BASED SATELLITE IMAGE

FIELD OF THE INVENTION

The present invention relates to generating positioning coefficients; more particularly, relates to generating positioning coefficients for a strip-based image taken by a pushbroom scanning satellite.

DESCRIPTION OF THE RELATED ARTS

The geometric correction of satellite images can be divided into two categories: one uses a rational function model (RFM) and the other uses a rigorous sensor model (RSM). The rigorous sensor model involves with complexity of dynamic sampling so that it is not familiar for those non-remote sensing user and is more complex than the RFM.

A general RFM is applied to only one standard image and the rational polynomial coefficient (RPC) obtained is called standard frame RPC. But most satellites take strip-based images along an orbit and the RFM is not fit to this kind of images.

The generation of RPCs can be divided into two categories: (1) The first category of RPCs is computed through utilizing ground control points (GCPs). Yet, owing to a lot of GCPs are used during the computation, this kind of method is limited to the number of GCPs. (2) And the second category of RCPs computed through using on-board data of the satellite. Yet, the absolute accuracy of the on-board data is limited, so that the absolute accuracy of the positioning coefficient is limited following the absolute accuracy of the on-board data.

Traditionally, RPCs are refined by a sequential process. A set of RPCs is built at first. Then, the set of RPCs is processed with an RPC refinement. And, then, another set of RPCs is built again to be processed with the RPC refinement. And so forth. Yet, some accuracy may be lost in such a process and the processing time is increased too.

Hence, the prior arts do not fulfill users' requests on actual use.

SUMMARY OF THE INVENTION

The main purpose of the present invention is to generate positioning coefficients for a strip-based image obtained by a satellite along an orbit, where the geometric adjustment is speeded up and the accuracy of the on-board data are improved through using a small number of GCPs.

To achieve the above purpose, the present invention is a method of generating positioning coefficients for a strip-based satellite image, comprising steps of: (a) obtaining a preliminary orbit by using first on-board data of a satellite; (b) correcting the orbit by using at least one ground control point and modifying the first on-board data to obtain second on-board data; (c) processing a back projection to obtain a plurality of virtual control points (VCPs); and (d) processing the VCPs with a least squares adjustment to obtain a plurality of positioning coefficients. Accordingly, a novel method of generating positioning coefficients for a strip-based satellite image is obtained.

BRIEF DESCRIPTION OF THE DRAWINGS

The present invention will be better understood from the following detailed description of the preferred embodiment according to the present invention, taken in conjunction with the accompanying drawings, in which

FIG. 4A is a view showing sets of position coordinates in the satellite positioning coefficients on obtaining an image by the satellite;

FIG. 4B is a view showing sets of rotation angles of 3D axes in the satellite positioning coefficients;

FIG. 5B is a view showing the position coordinates of the point number 1 of the GCP and the point number 2~30 of the ICPs;

FIG. 5C is a view showing the position coordinates of the point number 31~60 of the ICPs;

FIG. 6 is a view showing the image parameter/positioning coefficients;

FIG. 7B is a view showing the absolute errors of the point number 31~60 of ICPs.

DESCRIPTION OF THE PREFERRED EMBODIMENT

The following description of the preferred embodiment is provided to understand the features and the structures of the present invention.

Figure 1:
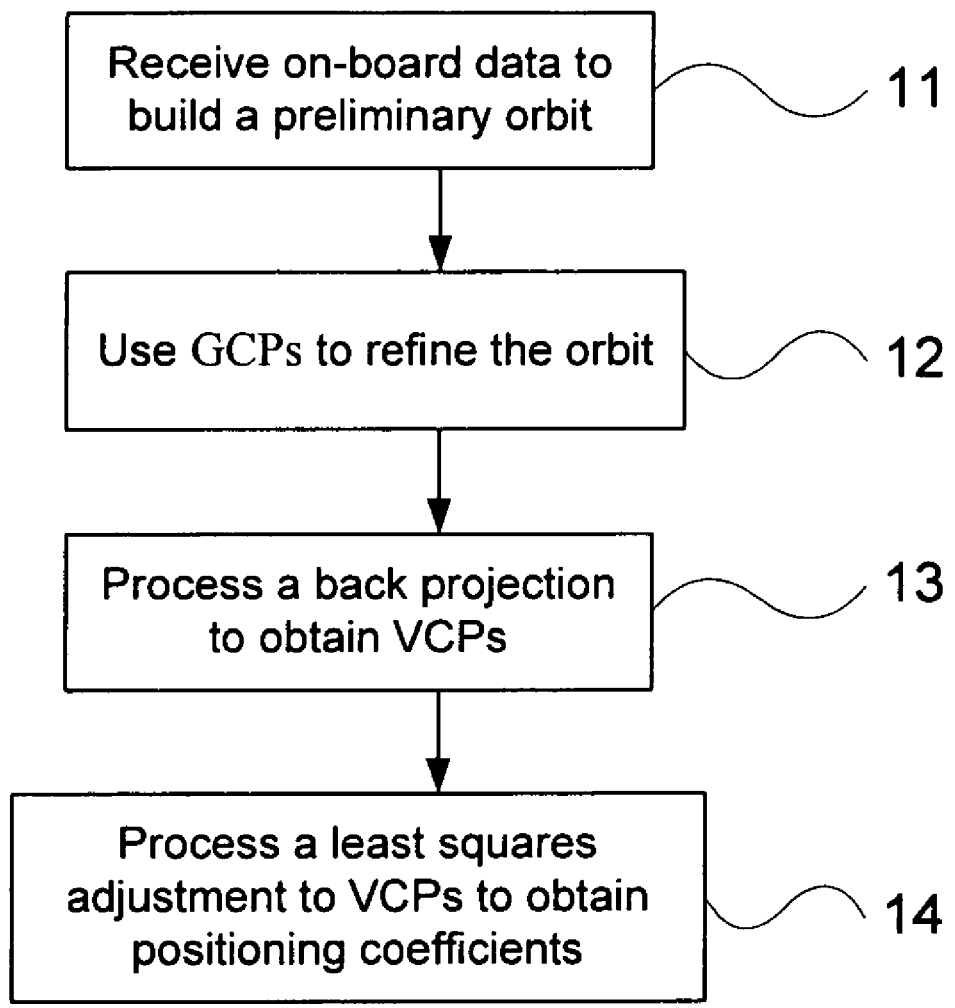
FIG. 1 is a view showing a flow chart of the preferred embodiment according to the present invention.
Figure 2:
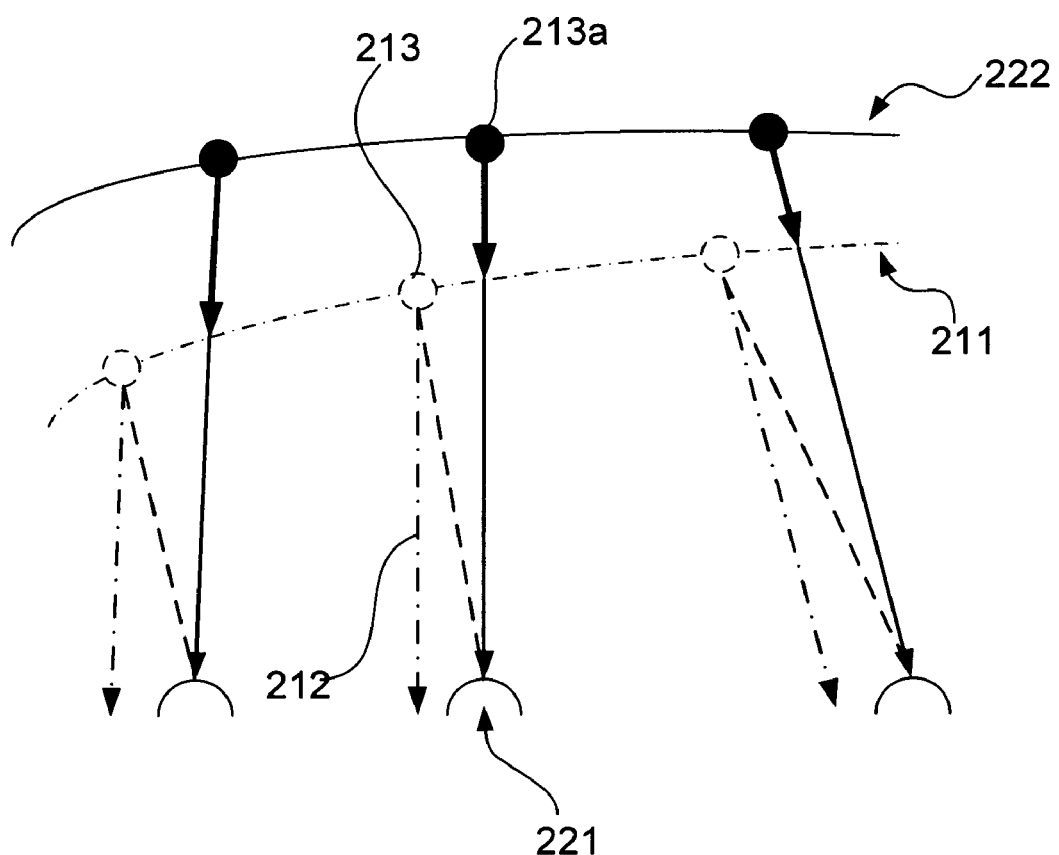
FIG. 2 is a view showing step (b)
Figure 3:
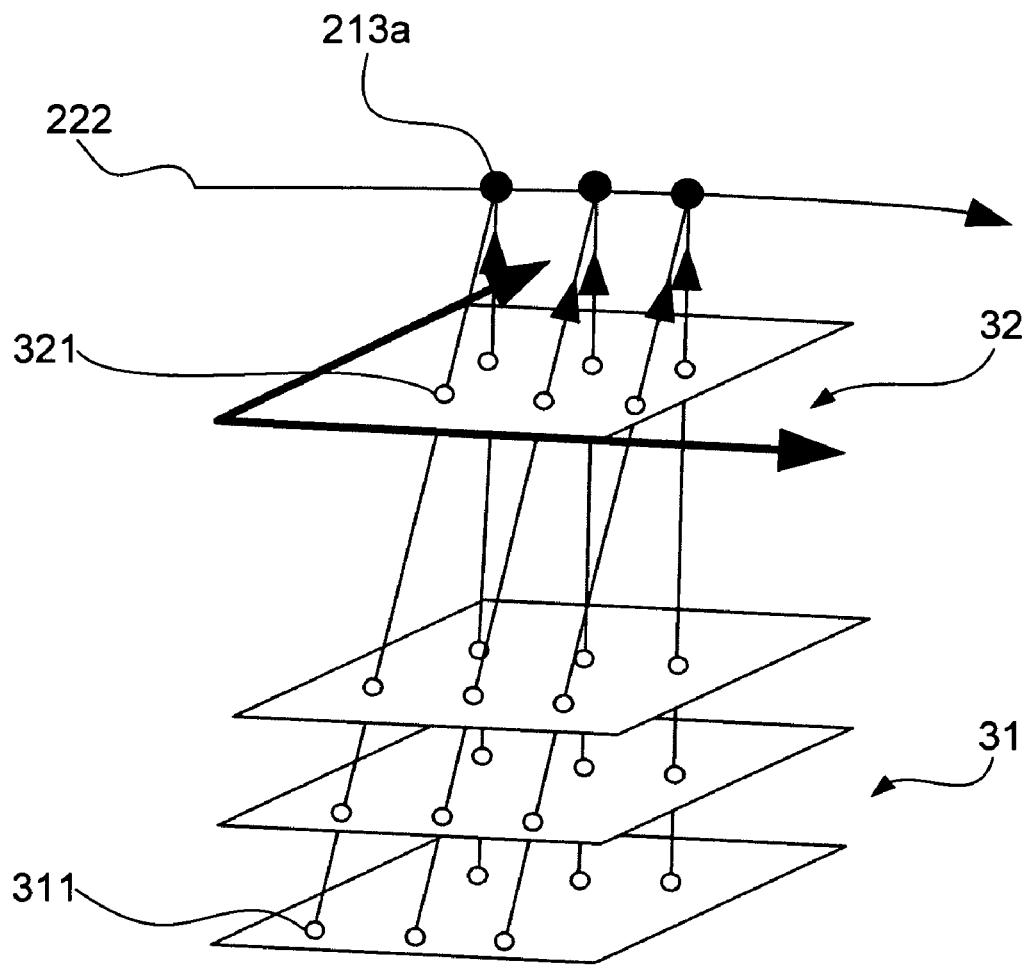
FIG. 3 is a view showing the back projection of step (c)

Please refer to FIG. 1, which is a view showing a flow chart of a preferred embodiment according to the present invention. As shown in the figure, the present invention is a method of generating positioning coefficients for a strip-based satellite image, comprising the following steps:

(a) Use on-board data of a satellite to build a preliminary orbit [11]: A set of first on-board data are used to obtain a preliminary orbit [211], where the first on-board data indicate directions and positions of a satellite on obtaining images; and the first on-board data comprise a plurality of first satellite positioning coefficients. Each first satellite positioning coefficient comprises a record of the satellite on obtaining an image and the record comprises a corresponding time for a scanning line, a set of position coordinates, and a set of rotation angles of three-dimensional (3D) axes. A preliminary orbit [211] is obtained from continuous satellite positioning coefficients, formed by interpolation the scattered satellite positioning coefficients. And, from the preliminary orbit [211] built, a line-of-sight and a satellite position for any specific moment is obtained.

(b) Use at least one ground control point (GCP) to refine the orbit 12: At least one GCP [221] is used to refine the first orbit [211] to obtain a set of second on-board data, where the GCP [221] comprises a set of two-dimensional (2D) image coordinates of an image space and a set of 3D ground coordinates of an object space and the GCP [221] is obtained by a manual measurement. When a line-of-sight [212] of the satellite for any moment in the preliminary orbit [211] obtained in step (a) do not pass through the GCP [221], a perspective center [213] is not on the same line with the GCP [221] and the preliminary orbit [211] has to be refined. Error amounts are computed for a transformation from the GCP [221] to the preliminary orbit

[211] so that perspective centers [213a] and the GCPs [221] are refined to be positioned on the same lines and an orbit after adjustment [222] and second on-board data are obtained. Therein, the second on-board data comprises a plurality of second satellite positioning coefficients; each second satellite positioning coefficient comprises a record of the satellite on obtaining an image; and the record comprises a corresponding time for a scanning line, a set of position coordinates, and a set of rotation angles of 3D axes.

(c) Process a back projection to obtain virtual control points (VCPs) [13]: A back projection is processed to obtain a set of 2D image coordinates [321] of an image space [32] corresponding to a set of 3D ground coordinates [311] of an object space [31]. The second on-board data obtained in step (b) and the orbit after adjustment [222] are used to obtain the set of corresponding 2D images coordinates [321] of the image space [32], coordinated with the set of 3D ground coordinates [311] of the object space [31]. Before building the set of 3D ground coordinates [311] of the object space [31], a covering area for the object space [31] is determined. Each set of corresponding 2D image coordinates [321] is found because the perspective center [213a], the position on the image space [32] and the position in the object space [31] are on a line; and, a VCP is thus obtained, where the VCP comprises the set of 2D image coordinates [321] of the image space [32] and the set of 3D ground coordinates [311] of the object space [31] and both are obtained through the back projection.

(d) Process a least squares adjustment to the VCPs to obtain positioning coefficients 14: The VCPs are processed with a least squares adjustment to obtain positioning coefficients by using the following formula:

$$S = \frac{(1ENH \ldots N^3H^3) \cdot (a_0 a_2 \ldots a_{19})^T}{(1ENH \ldots N^3H^3) \cdot (b_0 b_2 \ldots b_{19})^T}$$ (Formula 1)

$$L = \frac{(1ENH \ldots N^3H^3) \cdot (c_0 c_2 \ldots c_{19})^T}{(1ENH \ldots N^3H^3) \cdot (d_0 d_2 \ldots d_{19})^T}$$

Therein, (S, L) is the set of 2D image coordinates [321] of the image space [32]; (E, N, H) is the set of 3D ground coordinates [311] of the object space [31]; $a_0$~$a_{19}$ and $b_0$~$b_{19}$ are the positioning coefficients on S-axis; and, $c_0$~$c_{19}$ and $d_0$~$d_{19}$ are the positioning coefficients on L-axis. Then Formula 1 is transposed to obtain the following formula:

$$S \cdot (1ENH \ldots N^3H^3) \cdot (b_0 b_2 \ldots b_{19})^T - $$ (Formula 2)
$$(1ENH \ldots N^3H^3) \cdot (a_0 a_2 \ldots a_{19})^T = 0$$
$$L \cdot (1ENH \ldots N^3H^3) \cdot (d_0 d_2 \ldots d_{19})^T - $$
$$(1ENH \ldots N^3H^3) \cdot (c_0 c_2 \ldots c_{19})^T = 0$$

And, then, Formula 2 is transformed into a matrix formula as follows: (Formula 3)

$$\begin{bmatrix} V_{S_1} \\ V_{L_1} \\ \vdots \\ V_{S_n} \\ V_{L_n} \end{bmatrix} = \begin{bmatrix} 1 & \cdots & H_1^3 & -S_1H_1 & \cdots & -S_1H_1^3 & 0 & \cdots & 0 & 0 & \cdots & 0 \\ \vdots & \ddots & \vdots & \vdots & \ddots & \vdots & \vdots & \ddots & \vdots & \vdots & \ddots & \vdots \\ 1 & \cdots & Z_n^3 & -S_nH_n & \cdots & -S_1H_n^3 & 0 & \cdots & 0 & 0 & \cdots & 0 \\ 0 & \cdots & 0 & 0 & \cdots & 0 & 1 & \cdots & H_1^3 & -L_1H_1 & \cdots & -L_1H_1^3 \\ \vdots & \ddots & \vdots & \vdots & \ddots & \vdots & \vdots & \ddots & \vdots & \vdots & \ddots & \vdots \\ 0 & \cdots & 0 & 0 & \cdots & 0 & 1 & \cdots & H_n^3 & -L_1H_n & \cdots & -L_1H_n^3 \end{bmatrix} \begin{bmatrix} a_0 \\ \vdots \\ a_{19} \\ b_1 \\ \vdots \\ b_{19} \\ c_0 \\ \vdots \\ c_{19} \\ d_1 \\ \vdots \\ d_{19} \end{bmatrix} - \begin{bmatrix} S_1 \\ L_1 \\ \vdots \\ S_n \\ L_n \end{bmatrix}$$

Therein, the $(S_1, L_1)$ to $(S_n, L_n)$ are separately the sets of 2D image coordinates [321] of the image space of the VCPs; the $(E_1, N_1, H_1)$ to $(E_n, N_n, H_n)$ are separately the sets of 3D ground coordinates [311] of the object space [31] of the VCPs; $a_0$~$a_{19}$ and $b_0$~$b_{19}$ are the positioning coefficients on S-axis; and $c_0$~$c_{19}$ and $d_0$~$d_{19}$ are the positioning coefficients on L-axis; the $V_{S_1}$, $V_{L_1}$, to $V_{S_n}$, $V_{L_n}$ are residuals; and the n is the number of VCPs. Hence, a formula is obtained by simplifying Formula 3:

$$V = AX - B$$ (Formula 4)

Therein, X is the set of positioning coefficients of $a_0$~$a_{19}$, $b_0$~$b_{19}$, $c_0$~$c_{19}$ and $d_0$~$d_{19}$.

Please refer to FIG. 4A and FIG. 4B, which are views showing sets of position coordinates of the satellite and sets of rotation angles of 3D axes in the satellite positioning coefficients on obtaining an image by the satellite. The French SPOT5 satellite obtains an image along an orbit of 480 kilometers (km) long, which is 8 times to 60 km of the length of a general orbit for a SPOT5 satellite. On-board data of the satellite comprise a plurality of satellite positioning coefficients; each satellite positioning coefficient comprises a record on obtaining an image by the satellite and the record comprises a corresponding time for a scanning line, a set of position coordinates (both shown in FIG. 4A), and a set of rotation angles of 3D axes (shown in FIG. 4B). In the corresponding times for scanning lines, the time for the first scanning line is 2005-09-20T02:30:07.581357; and the time interval is 3.7599814378e-04 seconds. Hence, the time for the i-th scanning line is the time for the first scanning line added with i times of the time interval.

Figure 5A:
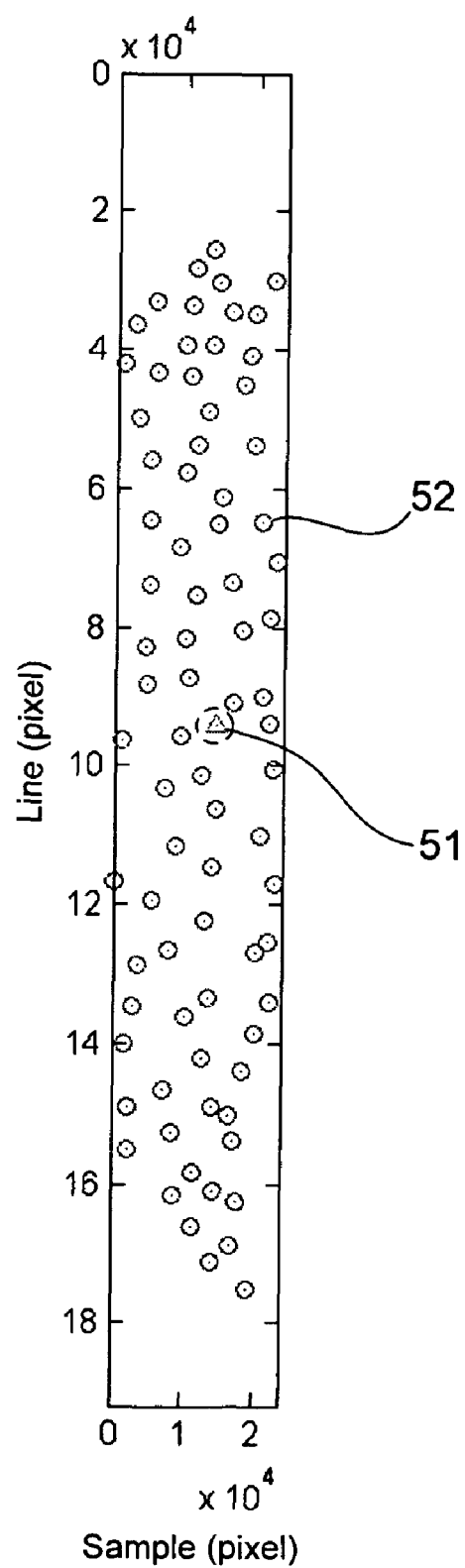
FIG. 5A is a view showing the distribution of the GCP and the ICPs.
Figure 5D:
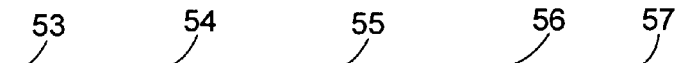
FIG. 5D is a view showing the position coordinates of the point number 61~80 of the ICPs.

Please refer to FIG. 5A to FIG. 5D, which are a view showing the distribution of the GCP and the ICPs and views showing the position coordinates of the point number 1 of the GCP and the point number 2~82 of the ICPs. As shown in the figures, the French SPOT5 satellite obtains an image along a 480 km-long orbit with a super-mode resolution of 2.5 meters (m) so that an image of 192000×24000 pixels are obtained. Therein, a GCP [51] and 81 ICPs [52] are included, as shown in FIG. 5A. FIG. 5B FIG. 5C and FIG. 5D shows the S-axis coordinate [53] and L-axis coordinate [54] of the 2D image coordinates of the image space, and E-axis coordinate [55], N-axis coordinate [56] and H-axis coordinate [57] of the 3D ground coordinate of the object space for the GCP [51] and the ICPs [52], where the GCP [51] is used to obtain positioning coefficients and ICPs [52] are used to examine the positioning coefficients.

Please refer to FIG. 6, which is a view showing the positioning coefficients. As shown in the figure, by the method of the present invention for modifying the positioning coefficients, L-axis positioning coefficients [61] and S-axis positioning coefficients [62] are obtained from the on-board data as shown in FIG. 4A and FIG. 4B, and the GCP as shown in FIG. 5B.

Figure 7A:
FIG. 7A is a view showing the absolute errors of the point number 2~30 of ICPs.
Figure 7C:
FIG. 7C is a view showing the absolute errors of the point number 61~80 of ICPs.

Please refer to FIG. 7A to FIG. 7C which are views showing absolute errors of the point number 2~82 of ICPs. The sets of S-axis coordinate [53] and L-axis coordinate [54] of the 2D image coordinates of the image space for the ICPs, and the sets of L-axis positioning coefficient [61] and S-axis positioning coefficient [62] are used in Formula 1 to obtain sets of S'-axis coordinate [71] and L'-axis coordinate [72] of the 2D image coordinates of the image space, which is then subtracted with sets of S-axis coordinate [53] and L-axis coordinate [54] of the 2D image coordinates of the image space to obtain sets of S-axis error [73] and L-axis error [74]. Then, the sets of S-axis error [73] and L-axis error [74] are used in the following formula:

$$RMSE_{Sample} = \sqrt{\frac{\sum_{i=1}^{n}(\Delta S_i)^2}{n}}$$ (Formula 5)

$$RMSE_{Line} = \sqrt{\frac{\sum_{i=1}^{n}(\Delta L_i)^2}{n}}$$

Consequently, a root-mean-squares error (RMSE) on S-axis is obtained as 1.62 pixels and a RMSE on L-axis is obtained as 1.72 pixels. Hence, the absolute error of the positioning coefficients is smaller then 2 pixels through the use of the GCP, which is 5 m based on a pixel of 2.5 m and is much better than the absolute error of the French SPOT5 satellite as 50 m. The present invention can be applied to different satellites such as IKONOS, QuickBird, EROS and FORMOSAT-2.

To sum up, the present invention is a method of generating positioning coefficients for a strip-based satellite image, where positioning coefficients are used in the strip-based image obtained by a satellite along an orbit to speed up the geometric adjustment and improve the accuracy of the on-board data through using a small number of GCPs.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A method of generating positioning coefficients for a strip-based satellite image, comprising steps of:
   (a) obtaining a preliminary orbit by using first on-board data;
   (b) correcting said preliminary orbit by using at least one ground control point (GCP) obtained by manual measurement, wherein each said GCP comprises a set of two-dimensional (2D) image coordinates of an image space and a set of 3D ground coordinates of an object space, and modifying said first on-board data to obtain second on-board data;
   (c) processing a back projection based on the second on-board data to obtain a plurality of virtual control point (VCP) for each data point of the second on-board data, wherein each VCP comprises a set of two-dimensional (2D) image coordinates of the image space and a set of 3D ground coordinates of the object space; and
   (d) processing said VCPs with a least squares adjustment to obtain a plurality of positioning coefficients,
   wherein said positioning coefficients are rational polynomial coefficients (RPC) which cover all of said strip-based satellite image.

2. The method according to claim 1, wherein said first on-board data comprises a plurality of first satellite positioning coefficients; and
   wherein each said satellite positioning coefficient comprises a record on obtaining an image by a satellite, said record comprising:
   a corresponding time for a scanning line;
   a set of position coordinates; and
   a set of rotation angles of three-dimensional (3D) axes.

3. The method according to claim 1, wherein said second on-board data have a plurality of second satellite positioning coefficients; and
   wherein each said second satellite positioning coefficient comprises data on obtaining an image by a satellite, said data comprising:
   a corresponding time for a scanning line;
   a set of position coordinates; and
   a set of rotation angles of 3D axes.

\* \* \* \* \*